Nov. 3, 1959     P. S. VILES     2,911,288

METHOD OF MAKING HYDROGEN

Filed May 28, 1956

INVENTOR.
Prentiss S. Viles,
BY

ATTORNEY.

United States Patent Office 2,911,288
Patented Nov. 3, 1959

2,911,288

METHOD OF MAKING HYDROGEN

Prentiss S. Viles, Baytown, Tex., assignor, by mesne assignments, to Esso Research and Engineering Company, Elizabeth, N.J., a corporation of Delaware Application May 28, 1956, Serial No. 587,566

11 Claims. (Cl. 23—212)

The present invention is directed to a method for producing hydrogen. More particularly, the invention is concerned with the production of hydrogen from hydrocarbons. In its more specific aspects, the invention is directed to the production of hydrogen from hydrocarbons in the presence of a mixture of cobaltous oxide and molybdic trioxide.

The present invention may be briefly described as involving the production of hydrogen from hydrocarbons by contacting a hydrocarbon with a mixture of cobaltous oxide and molybdic trioxide at a temperature within the range of 850° to 1600° F. to form a product containing a major or substantial amount of hydrogen and thereafter recovering the product.

Steam may be admixed with the hydrocarbon and sometimes it will be very desirable to mix steam with the hydrocarbon since when steam is present in the hydrocarbon feed stock of the present invention a product is formed comprising a major portion of hydrogen and a minor portion of carbon monoxide. Furthermore, it is advantageous to employ steam because carbon is not deposited on the catalyst during this reaction and the catalyst retains its activity in forming hydrogen and carbon monoxide.

The amount of steam employed when steam is included in the hydrocarbon feed may range downwardly from the theoretical amount of one mol of water per mol of carbon present in the hydrocarbon feed, since the addition of more than the theoretical would result in the formation of some undesired carbon dioxide. The preferred amount of added steam is one mol of steam for each mol of carbon present in the hydrocarbon feed. It may be stated that the amount of steam employed may vary downward from the theoretical depending on the concentration of carbon monoxide desired in the product in the range from about 0.25 to about 1 mol of steam for each mol of carbon.

The feed hydrocarbon may be a normally gaseous saturated hydrocarbon having 1 to 3 carbon atoms in the molecule. Preferred feed stocks will include methane, ethane, and propane, natural gas, and normally gaseous components of natural gas. It will be desirable not to employ the $C_4$, $C_5$, and $C_6$ hydrocarbons.

The catalyst employed in the present invention is a mixture of cobaltous oxide and molybdic trioxide preferably on a support. Within the purview of the present invention, the catalyst is a mixture of cobaltous oxide (CoO) and molybdic trioxide ($MoO_3$). The cobaltous oxide and molybdic trioxide may be employed in a preferred ratio of mol per mol as the catalyst but the ratio of cobaltous oxide to molybdic trioxide may range from 0.1:1 to 1:0.1 mol of cobaltous oxide per mol of molybdic trioxide.

The amount of the catalyst mixture on the support may range from about 1.0 to 25.0 weight percent with a preferred amount of approximately 15.0% by weight of the total catalyst.

The supports for the catalyst mixture may suitably be alumina, zirconia, magnesia, silica, silica-alumina, Filtrol, kieselguhr, Floridan, and the like. Preferred supports are pure alpha and gamma alumina.

The temperatures employed in the practice of the present invention may suitably fall within the range of about 850° to about 1600° F. with a preferred temperature range of 1100° to about 1400° F. Quite satisfactory results have been obtained at about 1300° F.

Low pressures are desirable in the practice of the present invention. The pressures may range from about 0 pounds absolute to about 1000 pounds per square inch gauge with a preferred pressure of about atmospheric.

The feed stock may be contacted with the catalyst at a suitable feed rate which may be in the range from about 1 to about 500 volumes of feed per volume of catalyst per hour with a preferred v./v./hour from about 50 to about 100. The reaction may be conducted in either the vapor or liquid phase but vapor phase is to be preferred.

The invention may be practiced in various types of equipment. For example, the reaction zone may have a catalyst bed arranged therein as a fixed bed or the reaction may be conducted in the so-called fluidized powder technique wherein the catalyst mixture is suspended in vaporized hydrocarbons. Furthermore, the reaction may be conducted in a suspension or in a slurry.

The present invention will be further illustrated by reference to the drawings in which.

Figure 1:
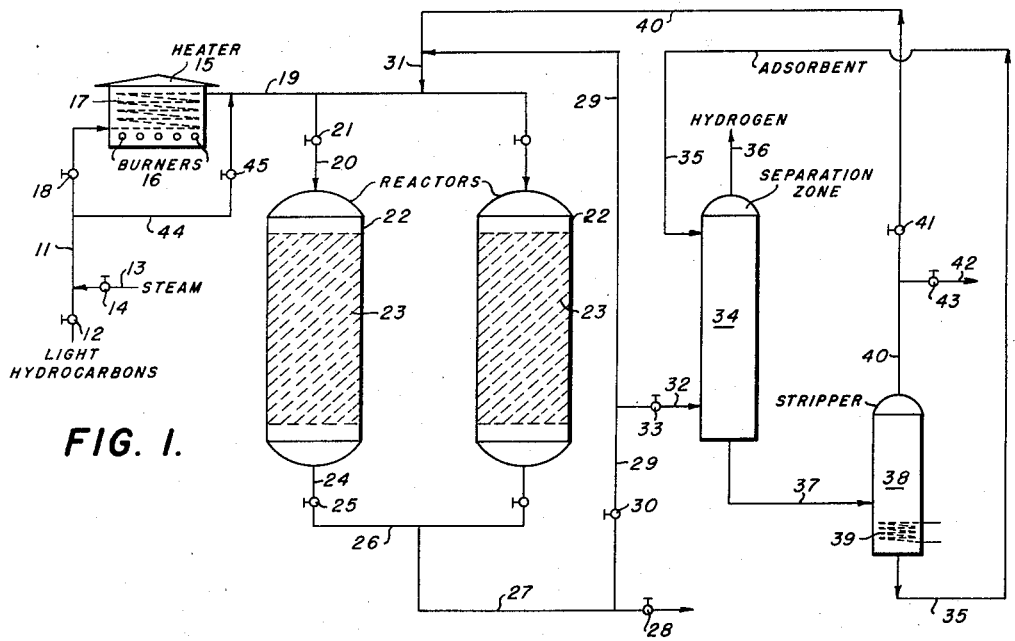
Fig. 1 is a flow diagram of a preferred mode.

Referring now to the drawing and particularly to Fig. 1, numeral 11 designates a charge line through which a light hydrocarbon, for example, methane or natural gas, may be introduced into the system from a source not shown. Line 11 is controlled suitably by valve 12 for reasons which will be indicated further hereinafter. Under some situations, it may be desirable to admix steam with the feed hydrocarbon and branch line 13 controlled by valve 14 is provided for that purpose. The hydrocarbon in line 11 passes into a heater or furnace 15 which may suitably be provided with gas burners 16 wherein the hydrocarbon is heated to a temperature within the range indicated in coil 17. It is to be noted that line 11 is provided with a second control valve 18 to allow bypassing of heater 15, as may be desired. The heated hydrocarbon is discharged from heater 15 by way of line 19 and then may be introduced by branch line 20 controlled by valve 21 into a reaction zone, such as 22, which may be a plurality of reaction zones.

Reaction zones 22 are provided with beds 23 of catalyst mixture supported on alumina, for example, for conducting the reaction. On passage of the feed hydrocarbon into contact with the bed 23 the feed hydrocarbon is substantially completely converted to hydrogen. This product is withdrawn from reaction zone 22 by way of line 24 controlled by valve 25 and then may be discharged by way of manifold 26 and line 27 controlled by valve 28. Since all of the methane on hydrocarbon may not be converted in a single pass to hydrogen, it may be desirable to recycle all or part of the product and to this end branch line 29 controlled by valve 30 is provided. Branch line 29 connects into line 31 which, in turn, connects into line 19.

Suitably the hydrogen may be separated from the unconverted hydrocarbon and provision is made to discharge at least a portion of the product in line 29 by way of line 32 controlled by valve 33 into a separation zone 34 which suitably may be an adsorption zone. In separation zone 34 the hydrogen-containing gas is contacted with a solid adsorbent, which may be of the molecular sieve type or any suitable adsorbent for hydrocarbons, introduced by line 35 into zone 34 such that the adsorbent contacts the hydrogen-containing gas counter-currently. Under the conditions prevailing in zone 34, which suitably may encompass temperatures in the range of −150° F. to 600° F. and pressures from 15 to 500 p.s.i.g., the methane is selectively absorbed on the adsorbent while the hydrogen remains unabsorbed and is discharged from zone 34 by line 36. The enriched adsorbent is discharged from zone 34 by line 37 and is discharged thereby into a stripping zone 38 provided with a heating means illustrated by steam coil 39 for adjustment of temperature and pressure. The stripped adsorbent is discharged from zone 38 by line 35 and re-introduced into zone 34 while the stripped methane is removed overhead by line 40 controlled by valve 41 and returned thereby to line 31 for re-use in the process. It may be desirable to discharge part of the methane from the system and means therefor are provided by line 42, controlled by valve 43. The adsorbent may suitably be employed as a fixed bed and may be stripped free of adsorbed hydrocarbon by use of a suitable stripping gas readily separable from the methane. Other methods may be employed for purifying hydrogen, such as described in Chemical Engineering Progress, September 1955, pages 399 to 402, inclusive.

It is to be noted that two reactors 22 are provided. It is possible to operate these two reactors in parallel or to employ one reactor while the other is undergoing regeneration to remove the carbon which is laid down on the catalyst mixture when the feed stock is only the hydrocarbon. This carbon may be removed from the catalyst by cutting out the hydrocarbon feed by closing valve 12 and allowing steam only to contact the catalyst mixture in either of the reaction zones by opening valve 14 in line 13. Of course, it is to be understood that for economy's sake it will be desirable to operate the other reactor while the fouled reactor is undergoing regeneration and separate lines will have to be provided to conduct such operations. For simplicity's sake these lines are not shown but it is to be clearly understood that such lines would ordinarily be provided.

In operating the mode of Fig. 1 where steam and hydrocarbon form the feed stock, valve 14 in line 13 and valve 12 in line 11 would both be open to form the desirable mixture of steam and hydrocarbon. Under these conditions, the product rather than being substantially hydrogen or unconverted feed hydrocarbon will be substantially hydrogen and carbon monoxide. This product may suitably be withdrawn by opening valve 28 in line 27. A suitable use for this product is as a feed gas for the Fischer-Tropsch synthesis of hydrocarbons or as a feed gas to the so-called oxo process.

It may be desirable under some conditions to bypass the heater 15 at least in part with the feed stock. Provision is, therefore, made to bypass either all or part of the hydrogen and/or steam from line 11 to line 19 by way of branch line 44 controlled by valve 45. Such bypassing may suitably be done to provide a control of temperatures to the reaction zones 22.

While an adsorption zone 34 has been shown as a means for separating hydrogen from methane, it is to be understood that adsorption zone 34 may be a fractional distillation zone, a combination of adsorption and compression zones and any separation means by way of which hydrogen may be separated from methane as desired. Adsorption zone 34 is shown merely for illustration purposes and is not to be construed as confining the invention to this illustrated mode of separating hydrogen and methane.

It will be seen from the foregoing description of Fig. 1 that a simple and readily effective mode of practicing the present invention has been provided which utilizes equipment readily available in the modern petroleum refinery.

Figure 2:
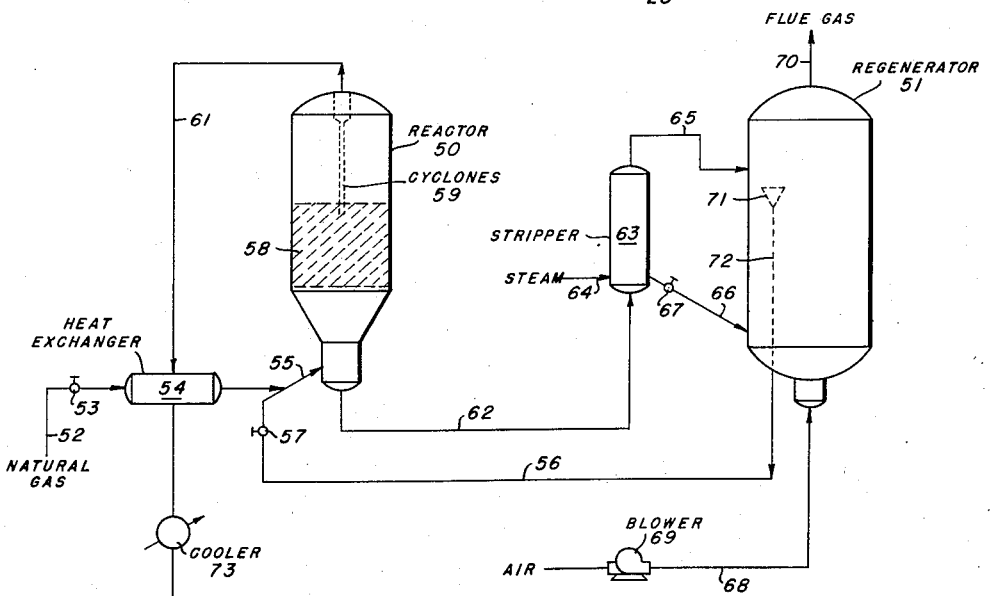
Fig. 2 is a flow diagram representing another mode of practicing the invention.

Referring now to Fig. 2 wherein a fluidized powdered technique will be described, a reaction zone 50 and a regeneration zone 51 are provided for conducting the reaction. Reaction zone 50 has a feed line 52 leading thereto controlled by valve 53 by way of which natural gas or other hydrocarbon feed stock is introduced. A heat exchanger 54 is provided in line 52 for heating the natural gas to reaction temperature. The heated natural gas is then introduced into inlet line 55 wherein it is admixed with regenerated catalyst mixture introduced thereby by line 56 controlled by valve 57. In reaction zone 50 which may suitably operate at a temperature of approximately 1300° F. and a pressure of 25 p.s.i.g., the natural gas components are converted substantially completely to hydrogen. The reaction takes place principally in a dense bed indicated by the shaded portion 58 and the hydrogen and unreacted hydrocarbon are separated from the catalyst mixture in a suitable separation zone, such as 59, which may be a plurality of cyclone separators arranged in the upper portion of the reaction zone 50. Separation zone 59 is provided with a dip leg 60 by way of which the catalyst mixture is returned to the dense bed 58. The separated hydrogen from separation zone 59 is discharged by line 61 and passes in heat exchange with the feed gas through heat exchanger 54 to allow preheating the natural gas feed.

The catalyst from dense bed 58 drops into the lower part of reaction zone 50 and is withdrawn therefrom by line 62 and discharged into a stripping zone 63 provided with an inlet line 64 by way of which a stripping gas, such as steam, may be introduced to remove volatile bodies from the catalyst mixture. This volatile material is introduced by line 65 into zone 51. The stripped catalyst mixture discharges by line 66 controlled by valve 67 into regeneration zone 51 wherein a combustion reaction takes place by means of a free oxygen-containing gas introduced thereto by line 68 containing a blower 69. Temperature conditions in zone 51 may suitably range from about 1100° F. to 1800° F. and pressures from about 0 to about 750 p.s.i.g. A suitable temperature in zone 51 may be approximately 1400° F. and a suitable pressure may be about 25 p.s.i.g. Subatmospheric pressures may be suitable. The combustion reaction in zone 51 causes carbonaceous bodies to be removed by combustion from the catalyst mixture and results in the formation of flue gas which is withdrawn from zone 51 by line 70. The regenerated catalyst mixture flows into a funnel-shaped member 71 which connects by line 72 to line 56 for return to reaction zone 50 as has been described.

The hydrogen after passage through heat exchanger 54 passes through a cooler 73, thence through a trap 74 and a filter 75 to remove any solid particles which may have been entrained with the hydrogen. The hydrogen is then withdrawn by line 76 and may be suitably used as a supply of hydrogen in thermal or catalytic operations requiring a supply of hydrogen. As typical of such operations may be mentioned hydrogenation, hydrodesulfurization, hydrocracking, hydrodealkylation and the like. Many operations requiring hydrogen will suggest themselves to the skilled workman.

In order to illustrate the practice of the invention further, runs have been made in which a substantially methane feed stock was contacted with cobalt molybdate at 1300° F. to show the yields obtainable from feed stocks of this nature. The catalyst employed was catalyst mixture supported on alumina. The results of these runs are shown in Table I:

TABLE I

| Charge Gas, Total Volume, Liters | Run Length, Hrs. | Charge Gas Rate, V./V./Hr. | Temp., °F. | Pressure, p.s.i.g. | Effluent Gas, Total Volumes | Hydrogen Produced, Total Volumes |
|---|---|---|---|---|---|---|
| 19.3 | 2 | 48 | 1,300 | Atmospheric | 33 | 27.4 |
| 22.7 | 3 | 37 | 1,300 | Atmospheric | 36 | 26.6 |
| 16.8 | 1 | 84 | 1,300 | 200 | 16 | 6.8 |
| 12.6 | 1 | 63 | 1,300 | 200 | 16 | 6.8 |

It will be seen from an examination of the data in Table I that substantial quantities of hydrogen were produced from the feed stock. The results here appear more desirable at atmospheric pressure than at the higher pressure.

The analyses of the products recovered from the runs shown in Table I are produced in Table II:

TABLE II

| Product Gas From— | Charge Gas | | | | |
|---|---|---|---|---|---|
| Hydrogen | 0.30 | 83.00 | 74.0 | 48.00 | 43.00 |
| Methane | 99.02 | 15.00 | 25.5 | 51.00 | 55.10 |
| Ethylene | 0.02 | 0.01 | | 0.01 | 0.01 |
| Ethane | 0.50 | | | | 0.02 |
| Propylene | | 0.10 | 0.04 | | |
| Propane | | 0.06 | 0.05 | | |
| Isobutane | | 0.02 | | | 0.06 |
| n-Butane | 0.04 | | 0.01 | | |
| Butylenes | 0.01 | | | 0.01 | 0.01 |
| Isopentane | 0.15 | | | 0.05 | 0.24 |
| n-Pentane | 0.02 | 0.01 | | | |
| Pentylenes | | | 0.01 | | |
| Cyclopentane and Heavier | | | | | |

Column 2 is the product from the run of two hours' duration, whereas columns 3, 4 and 5 are the analyses from the product of the other runs of three, one and one-half hours' duration, respectively. It will be seen that the product from the runs of two and three hours' duration comprises a major amount of hydrogen and minor amounts of the feed stock and other hydrocarbons. It will be noted from the data in Table II that the runs at the higher pressure had decreasing amounts of hydrogen. It is to be understood that when operating at the higher pressures within the range indicated, it may be desirable to recycle the product to insure the production of a major amount of hydrogen in the product.

Other operations were conducted with a catalyst mixture supported on alumina with methane, ethane and propane with temperatures of 1300° F. for methane, ethane and propane in one instance and a temperature of 1550° F. for the propane in the second instance. Pressures were atmospheric. The results of these operations are shown in Table III:

TABLE III
*Product gas analyses*

| Charge Gas | Methane | Ethane | Propane | Propane |
|---|---|---|---|---|
| Charge Gas Rate, V./V./Hr. | 80 | 80 | 80 | 80 |
| Temperature, °F. | 1,300 | 1,300 | 1,300 | 1,550 |
| Mol Percent: | | | | |
| Hydrogen | 97.5 | 97.91 | 43.46 | 89.66 |
| Methane | 1.4 | 0.30 | 49.28 | 10.02 |
| Ethylene | 0.3 | 0.05 | 2.62 | 0.02 |
| Ethane | 0.5 | 0.65 | 1.6 | 0.06 |
| Propylene | | | 0.83 | 0.05 |
| Propane | | 0.15 | 1.91 | 0.01 |
| Isobutane | | | | |
| n-Butane | 0.11 | 0.07 | 0.04 | 0.04 |
| Butylenes | | | 0.03 | |
| Isopentane | 0.15 | 0.04 | | |
| n-Pentane | 0.02 | 0.03 | | 0.01 |
| Pentylenes | 0.02 | 0.01 | | |
| Cyclopentane and Heavier | | 0.06 | | 0.05 |

It will be clear from the data in Table III that with methane and ethane at 1300° F. substantially pure hydrogen was obtained, whereas with propane at 1300° F. the hydrogen contained substantial amounts of methane which will require recycling to the operation. At higher temperature, however, at the charged gas rate the propane was substantially completely converted to hydrogen.

Additional runs were made with a substantially pure methane feed stock at varying temperatures to illustrate effective temperatures in the production of pure hydrogen. Pressures were atmospheric and the catalyst mixture was supported on alumina. The results of these operations are shown in Table IV:

TABLE IV

| Sample | Charge Gas | Product Gas | Product Gas | Product Gas |
|---|---|---|---|---|
| Reaction Temperature, °F. | | 1,100 | 1,200 | 1,300 |
| Mol percent: | | | | |
| Hydrogen | 0 | 23.05 | 74.55 | 94.21 |
| Methane | 99.64 | 76.67 | 25.29 | 5.61 |
| Ethylene | 0.02 | | 0.01 | 0.02 |
| Ethane | 0.11 | 0.11 | 0.03 | 0.03 |
| Propylene | 0.02 | 0.08 | 0.01 | 0.08 |
| Propane | 0.04 | 0.06 | 0.03 | 0.02 |
| Isobutane | 0.02 | 0.04 | | |
| n-Butane | 0.02 | | 0.04 | 0.05 |
| Butylenes | 0.03 | | | |
| Isopentane | 0.05 | | | |
| n-Pentane | 0.02 | | 0.04 | |
| Pentylenes | 0.02 | | 0.01 | |
| Cyclopentane and Heavier | | | | |

It will be seen from the analyses presented in Table IV that best results were obtained at 1300° F., the product being substantially completely pure hydrogen. At lower temperatures of approximately 1100° F. the hydrogen was in a minor amount indicating the necessity for recycling.

In order to show the effect of varying the pressure, operations were conducted at atmospheric and 200 p.s.i.g. pressure employing substantially pure methane as the feed stock. These data are shown in Table V:

TABLE V
*Gas analyses*

| Charge Gas | | Methane | Methane | Methane |
|---|---|---|---|---|
| Charge Rate, V./V./Hr. | | 80 | 80 | 200 |
| Reactor Pressure | | Atmospheric | 200 p.s.i.g. | 200 p.s.i.g. |
| Sample | Charge Gas | Product Gas | Product Gas | Product Gas |
| Mol percent: | | | | |
| Hydrogen | 0 | 94.79 | 51.73 | 46.25 |
| Methane | 99.64 | 4.81 | 47.68 | 52.86 |
| Ethylene | 0.02 | | | |
| Ethane | 0.11 | | 0.01 | 0.13 |
| Propylene | 0.02 | 0.14 | 0.16 | 0.16 |
| Propane | 0.04 | 0.05 | 0.04 | 0.02 |
| Isobutane | 0.02 | | 0.04 | |
| n-Butane | 0.02 | 0.07 | 0.02 | 0.04 |
| Butylenes | 0.03 | 0.03 | 0.04 | 0.10 |
| Isopentane | 0.05 | | | 0.09 |
| n-Pentane | 0.02 | 0.22 | 0.20 | 0.26 |
| Pentylenes | 0.02 | | 0.01 | 0.02 |
| Cyclopentane and Heavier | | 0.06 | 0.06 | 0.06 |

It will be seen that a constant charge rate of 80 v./v./hr. at atmospheric pressure gives the best results, the temperature in both instances being 1300° F. At higher charge rates at 200 p.s.i.g. pressure the hydrogen production was affected adversely.

Additional runs were made to illustrate the effect of varying charge gas rates and to this end runs were made of a substantially pure methane at a temperature of 1300° F. and atmospheric pressure employing catalyst mixture supported on alumina as a catalyst. The results of runs at varying charge rates are shown in Table VI:

TABLE VI

*Product gas analyses*

| Sample | Charge Gas | After Total of 1 Hour | After Total of 1.5 Hours | After Total of 2 Hours | After Total of 4 Hours | After Total of 4.75 Hours |
|---|---|---|---|---|---|---|
| Charge Gas Rate, V./V./Hr. | 0 | 80 | 160 | 240 | 80 | 240 |
| Mol Percent: | | | | | | |
| Hydrogen | | 97.5 | 84.00 | 72.10 | 90.10 | 68.80 |
| Methane | 99.0 | 1.4 | 15.50 | 27.50 | 9.60 | 30.10 |
| Ethylene | | 0.3 | 0.01 | 0.04 | 0.02 | 0.05 |
| Ethane | 0.5 | 0.5 | 0.08 | 0.01 | 0.01 | |
| Propylene | 0.05 | | 0.02 | | | |
| Propane | 0.10 | | 0.12 | | | |
| Isobutane | | | 0.01 | | | |
| n-Butane | 0.02 | 0.11 | 0.02 | | 0.06 | 0.07 |
| Butylenes | | | 0.06 | | | |
| Isopentane | 0.03 | 0.15 | 0.05 | 0.16 | 0.15 | 0.14 |
| n-Pentane | | 0.02 | | 0.04 | | 0.10 |
| Pentylenes | | 0.02 | 0.05 | 0.02 | 0.01 | 0.04 |
| Cyclopentane and Heavier | 0.04 | | 0.05 | 0.05 | 0.04 | |

Considering the data in Table VI, it will be seen that best results are obtained at a charge gas rate of about 80 v./v./hr. although desirable results are obtained at the higher charge gas rates.

In order to show the effect of regenerating the catalyst mixture after deposition of carbon thereon in the production of hydrogen in accordance with the present invention, catalysts which have been regenerated by burning were reused in the production of hydrogen employing a temperature of 1300° F. atmospheric pressure and a charge gas rate of 26 v./v./hr. This catalyst was regenerated catalyst mixture supported on gamma alumina. The data from the operations are presented in Table VII wherein analyses of the product are given where the product was obtained after varying times of use of the regenerated catalyst:

TABLE VII

*Product gas analyses*

| | Charge Gas | After Three-Fourths Hour | After Two and One-Fourth Hours |
|---|---|---|---|
| Total Volume Product Gas, Liters | 0 | 5.6 | 20.55 |
| Mol Percent: | | | |
| Hydrogen | 0 | 85.3 | 98.8 |
| Methane | 99.0 | 9.1 | 0.5 |
| Ethylene | | 0.1 | 0.3 |
| Ethane | 0.50 | 0.7 | 0.15 |
| Propylene | 0.05 | | |
| Propane | 0.10 | | |
| Isobutane | | | |
| n-Butane | 0.02 | 0.5 | 0.30 |
| Butylene | | 0.2 | 0.01 |
| Isopentane | 0.03 | 1.6 | |
| n-Pentane | | 1.6 | 0.23 |
| Pentylenes | | 0.8 | 0.03 |
| Cyclopentane and Heavier | 0.04 | | |

It will be seen from the data in Table VII wherein the results of these runs are presented that regeneration does not affect the catalytic activity of the catalyst in producing hydrogen from hydrocarbons.

In order to show that the catalyst mixture is a desirable catalyst in the practice of the present invention, runs were made wherein the catalyst of the present invention was compared with the support and the components of the supported catalyst mixture. Comparisons are also made with other catalysts to show the unexpected improvement effected in the practice of the present invention. The data in Table VIII which follows was obtained with natural gas as a feed stock at a temperature of 1300° F., atmospheric pressure and a charge gas rate of 60 v./v./hr.:

TABLE VIII

*Gas analyses (mass spectrometer)*

[Operating conditions: Charge gas—natural gas from utility system; pressure—atmospheric; charge rate—60 v./v./hr.; catalyst—as indicated.]

| Sample | Charge Gas | Product Gas | Product Gas | Product Gas | Product Gas | Product Gas | Product Gas | Product Gas |
|---|---|---|---|---|---|---|---|---|
| Reaction Temp., °F | | 1,300 | 1,300 | 1,300 | 1,300 | 1,300 | 1,300 | 1,300 |
| Catalyst Used | | Catalyst Mixture on Gamma Alumina | Gamma Alumina Support Used for catalyst Mixture | Molybdic Oxide Supported on Alumina | Pure Cobalt Oxide Without Support | Iron Oxide Type Catalyst | Cobalt Oxide Supported on Alpha Alumina | Silica-Alumina Cracking Catalyst |
| Mol Percent: | | | | | | | | |
| Hydrogen | 0.22 | 94.21 | 36.79 | 40.77 | 60.20 | 1.06 | 39.33 | 5.17 |
| Methane | 96.51 | 5.61 | 63.07 | 58.36 | 39.15 | 97.27 | 60.15 | 93.78 |
| Ethylene | 0.13 | 0.02 | 0.01 | 0.14 | 0.04 | 0.21 | 0.21 | 0.15 |
| Ethane | 2.36 | 0.03 | 0.03 | 0.03 | 0.28 | 1.31 | 0.12 | 0.06 |
| Propylene | | 0.08 | 0.01 | | | 0.01 | 0.03 | 0.24 |
| Propane | 0.43 | 0.02 | 0.08 | | | 0.12 | 0.01 | |
| Isobutane | | | | | | 0.01 | | 0.08 |
| n-Butane | 0.04 | 0.05 | 0.01 | 0.10 | 0.07 | | 0.05 | 0.06 |
| Butylenes | | | 0.01 | | | | | 0.03 |
| Isopentane | | | 0.03 | | | 0.02 | | 0.11 |
| n-Pentane | 0.09 | | 0.01 | 0.30 | 0.13 | | | 0.24 |
| Pentylenes | | | | 0.02 | 0.01 | | 0.05 | 0.01 |
| Cyclopentane and Heavier | 0.21 | | | 0.28 | 0.08 | | 0.05 | 0.06 |

It will be seen from Table VIII that in employing the catalyst of the present invention very desirable results are obtained, whereas the support for the catalyst does not give good results. Again comparing the catalyst of the present invention with the components thereof, specifically molybdic oxide and cobaltous oxide, it will be clear that a synergistic result is obtained by employing catalyst mixture rather than molybdic trioxide or cobaltous oxide alone. Also it is to be noted that the present invention gives vastly superior results over other catalysts under the same conditions; for example, iron oxide does not effectively convert and silica-alumina is also substantially ineffective.

From these data, it may be concluded that a mixture of cobaltous oxide and molybdic trioxide, termed herein as catalyst mixture, gives a synergistic result in the production of hydrogen from methane.

In order to illustrate the production of a mixture of hydrogen and carbon monoxide, runs were made with a dry natural gas from a commercial utility system and with the natural gas plus 3 mol percent of water vapor added thereto. These operations were conducted at a temperature of 1300° F., at atmospheric pressure and at a charge gas rate of 60 volumes of gas per volume of catalyst mixture per hour.

The data in the following Table IX shows the hydrocarbon and carbon oxide analyses of the feed gas and the production gas from the two runs:

TABLE IX

| Gas Sample | Natural Gas from Utility System | Product Gas from Charging Dry Natural Gas | Product Gas from Natural Gas plus 3 percent Water Vapor |
|---|---|---|---|
| Mol. percent: | | | |
| Carbon Dioxide | Trace | | 0.82 |
| Carbon Monoxide | | | 14.30 |
| Hydrogen | | 93.07 | 51.54 |
| Methane | 96.0 | 0.89 | 32.27 |
| Ethylene | | | |
| Ethane | 3.0 | 0.63 | 0.15 |
| Propylene | | 0.13 | 0.21 |
| Propane | Trace | | |
| Isobutane | | | |
| n-Butane | | 1.70 | 0.50 |
| Butylenes | | | 0.07 |
| n-Pentane | | 1.63 | |
| Pentylenes | | | 0.13 |
| Cyclo C₅ and Heavier | | 1.95 | |

It will be noted from the data in Table IX that where water vapor was not present substantially pure hydrogen was produced, but when water vapor was added hydrogen in a major amount and carbon monoxide were produced with minor and insignificant amounts of carbon dioxide and hydrocarbons. These data show that both hydrogen and carbon monoxide may be produced and further show that the amount of carbon monoxide may be controlled by the amount of water added.

The present invention, besides being very useful in the production of hydrogen and mixtures of hydrogen and carbon monoxide for use in various catalytic and thermal processes, is also quite useful in producing maximum quantities of hydrogen from the hydrocarbon charged. This may be accomplished by charging the hydrocarbon as has been described with respect to the several figures of the drawing to form hydrogen and deposit carbon on the catalyst. Thereafter the catalyst mixture is treated with steam, as has been described, at a temperature of about 1300° F. to form hydrogen and carbon monoxide. The hydrogen and carbon monoxide mixture may then be passed over a supported iron oxide catalyst to convert the carbon monoxide to carbon dioxide in the presence of additional quantities of steam. The carbon dioxide is removed by suitable means, such as absorption in a solution of mono- or diethanolamine or the like, and the purified hydrogen resulting therefrom may be combined from the hydrogen formed by initial decomposition of a hydrocarbon. In other words, in this mode of practicing the present invention, hydrogen is obtained not only from the hydrocarbon but also from steam by reaction with the carbon and carbon monoxide. This is quite advantageous in that the carbon which has been deposited on the catalyst mixture not only is removed from the catalyst mixture and the catalyst put into condition for reuse but it serves as a means for producing additional hydrogen.

The present invention is susceptible to many variations all coming within the purview of the claims. It is intended that the several examples are given by way of illustration and not to be construed by way of limitation.

This application contains subject matter common to an application entitled "Treatment of Hydrocarbons," Serial No. 587,699, filed May 28, 1956, for Prentiss S. Viles.

The nature and objects of the present invention having been completely described and illustrated, what I wish to claim as new and useful and to secure by Letters Patent is:

1. A method for preparing hydrogen which comprises contacting a saturated hydrocarbon having 1 to 3 carbon atoms in the molecule with a catalyst mixture of cobaltous oxide and molybdic trioxide in a mol ratio in the range of 0.1:1 to 1:0.1 at a temperature within the range of 850° to 1600° F. at a pressure within the range from about 0 pound absolute to about 1000 p.s.i.g. and at a feed rate within the range from about 1 to about 500 volumes of hydrocarbon per volume of catalyst per hour to form a product containing a substantial amount of hydrogen and recovering said product.

2. A method in accordance with claim 1 in which water is admixed with the hydrocarbon.

3. A method in accordance with claim 1 in which the catalyst mixture is supported.

4. A method in accordance with claim 1 in which the hydrocarbon is methane.

5. A method in accordance with claim 1 in which the hydrocarbon is natural gas.

6. A method in accordance with claim 1 in which the hydrocarbon is ethane.

7. A method for preparing hydrogen which comprises forming a bed of supported catalyst mixture of cobaltous oxide and molybdic trioxide in a mol ratio in the range of 0.1:1 to 1:0.1 in a reaction zone, contacting said bed with a saturated hydrocarbon having from 1 to 3 carbon atoms in the molecule at a temperature within the range of 850° to 1600° F. and at a pressure within the range of 0 pound absolute to about 1000 p.s.i.g. at a space velocity in the range of about 1 to about 500 volumes of hydrocarbon per volume of catalyst per hour to form a product containing a substantial amount of hydrogen, and recovering said product.

8. A method for preparing hydrogen which comprises forming a suspension of a catalyst mixture of cobaltous oxide and molybdic trioxide in a mol ratio in the range of 0.1:1 to 1:0.1 in a saturated hydrocarbon having from 1 to 3 carbon atoms in the molecule at a temperture within the range of 850° to 1600° F. and at a pressure within the range of 0 pound absolute to about 1000 p.s.i.g. at a space velocity in the range from about 1 to about 500 volumes of vaporized hydrocarbon per volume of catalyst per hour to form a product containing a substantial amount of hydrogen, separating the product from the catalyst, and recovering said product.

9. A method for preparing hydrogen which comprises contacting a saturated hydrocarbon having from 1 to 3 carbon atoms in the molecule with a catalyst mixture of cobaltous oxide and molybdic trioxide in a mol ratio in the range of 0.1:1 to 1:0.1 at a temperature within the range of about 850° to 1600° F. and at a pressure within the range from about 0 pound absolute to about 1000 p.s.i.g. at a space velocity in the range of about 1 to about 500 volumes of hydrocarbon per volume of catalyst per hour to form a product containing a substantial amount of hydrogen, continuing the contacting operation until the cobalt molybdate catalyst shows decreasing activity for forming said hydrogen product, interrupting the contacting of the hydrocarbon with said catalyst, contacting the catalyst with water vapor at a temperature within the range of about 850° to about 1600° F. for a sufficient length of time to remove carbonaceous bodies deposited on said catalyst and to regenerate said catalyst, and then resuming the contacting of said hydrocarbon with said regenerated catalyst.

10. A method for preparing hydrogen which comprises contacting a sataurated hydrocarbon having from 1 to 3 carbon atoms in the molecule in the presence of water vapor with a catalyst mixture of cobaltous oxide and molybdic trioxide in a mol ratio in the range of 0.1:1 to 1:0.1 at a temperature within the range of about 850° to about 1600° F. and at a pressure within the range of 0 pound absolute to about 1000 p.s.i.g. and at a space velocity within the range of 1 to about 500 volumes of hydrocarbon per volume of catalyst per hour to form a product containing a substantial amount of hydrogen and unreacted hydrocarbon, and contacting at least the unreacted hydrocarbon in said product again with said cobalt molybdate catalyst.

11. A method in accordance with claim 1 in which the hydrocarbon is propane.

References Cited in the file of this patent

UNITED STATES PATENTS

| | | |
|---|---|---|
| 1,497,751 | Hopkinson | June 17, 1924 |
| 1,868,919 | Schmidt et al. | July 26, 1932 |
| 2,392,738 | Holder et al. | Jan. 8, 1946 |
| 2,393,288 | Byrns | Jan. 22, 1946 |
| 2,425,754 | Murphree et al. | Aug. 19, 1947 |
| 2,513,022 | Helmers et al. | June 27, 1950 |
| 2,573,726 | Porter et al. | Nov. 6, 1951 |
| 2,707,147 | Shapleigh | Apr. 26, 1955 |
| 2,800,395 | Bond | July 23, 1957 |